Patented Sept. 7, 1926.

1,599,056

UNITED STATES PATENT OFFICE.

HENRY DAVID LLOYD AND CHARLES EDWARD HILL, OF WARRINGTON, ENGLAND, ASSIGNORS OF ONE-THIRD TO THE WHITECROSS COMPANY LIMITED, OF WARRINGTON, LANCASTER, ENGLAND.

ELECTRODE FOR WELDING AND LIKE PURPOSES.

No Drawing. Application filed November 12, 1923, Serial No. 674,356, and in Great Britain December 18, 1922.

This invention relates to the manufacture or more specifically to the coating of welding and like electrodes.

It is applicable to the coating of electrodes, metals, alloys or other metallic materials used for the purpose of electric welding, autogenous soldering or the like (hereinafter in this specification and claims referred to as electrodes) particularly for coating electrodes made of commercially pure ingot iron (that is, iron containing not more than about 0.16 per cent. of impurities) but it is not limited thereto and may be used for other ferrous electrodes such as steel, alloy steel or other cores containing iron.

The object of the invention is to provide an improved or modified flux coating composition.

The invention in brief consists in a coating composition suitable for ferrous welding and like electrodes including titanium, preferably in the form of a silicious titanium-containing fireclay with or without an admixture of china clay and if desired titaniferous iron ore.

The invention also consists in a coating for electrodes containing titanium in which the titanium content is adjusted by the employment of ilmenite or titanite, preferably with silica flour.

The invention also consists in electrodes with coatings for the purpose described and compounded of the materials hereinafter specified in substantially the proportions given.

In carrying the invention into effect in one form by way of example, we prepare a flux of substantially the following composition:—

| | Parts by weight. |
|---|---|
| China clay | 18–28 |
| Silicious fire-clay | 25–35 |
| Silica flour | 0–10 |
| Freshly burnt lime | 12–16 |
| Iron ore | 30–40 |
| Titanite or ilmenite | 10– 0 |

These materials, ground to pass a mesh of 90 per lineal inch, are intimately mixed with 40–60 parts of silicate of soda of a strength indicated by 50–60° Twaddell. The thin paste thus produced we apply to the metallic core by the dipping or painting process, adjusting the thickness of the coating by the number of dips or coats given to the core.

Whether applied by dipping or painting, we leave approximately one inch of the core uncovered for purposes of contact, this uncoated portion being either at the end of the rod or midway along the rod, the latter providing a more evenly balanced electrode and enabling a longer electrode to be employed.

The above composition serves to give a slag on fusion.

Silicious fire-clay contains titanium in varying amounts, but is largely composed of silica. The particular fire-clay we prefer to use is one containing a comparatively high percentage of titanium, namely, of the order of 0.75 to 1 per cent. Such fire-clay can for instance be obtained from Staffordshire, England, but for varying the formula for other fire-clays regard should be paid to the different titanium content which can readily be found by accepted methods of analysis.

The titanium content of the composition may be lowered by employing silica flour in place of a corresponding proportion of the silicious fire-clay and can be raised by substituting or adding a suitable proportion of titaniferous iron ore, ilmenite or titanite.

The addition of china clay within the limits mentioned raises the melting point of the flux and slag, so that, while protecting the deposited metal from oxidation, the slag has no tendency to flow away from the deposited metal on to the unwelded portion of the work. We thus minimize the inclusion of slag in the weld.

The china clay and silicious fire-clay are also useful for their heat retaining properties, particularly when alternating current is employed, thus helping to preserve the continuity of the arc and to maintain an arc of constant length.

The silicious fire-clay and the iron ore carry titanium and manganese in the form of oxides, and we may increase the manganese.

The titanium appears to serve to deprive the deposited metal of nitrogen and nitrides, thus giving a more ductile weld, and we may adjust the titanium content of the mixture by adding titanium in the form of ilmenite (titaniferous iron ore) or titanite (calcium titanium silicate).

The manganese and titanium content (when calculated as elements) we prefer to keep below 5 per cent by weight of the mixture.

The silica and lime serve to adjust the basicity of the slag and with the iron ore serve as diluents.

The above materials are chosen so that the flux on fusion gives off no carbon dioxide or other poisonous fumes and it is for this and other reasons preferred that neither free carbon nor carbonates be present.

The flux leaves on the deposited metal a slag which protects the metal from oxidation. The slag is such that on cooling it is readily brushed from the deposited metal.

In brief we employ china clay:
(a) To control the melting point of the flux and slag;
(b) For its heat insulating properties;
silicious fire-clay:
(a) To introduce titanium into the flux;
(b) For its heat insulating properties;
and ilmenite, titanite and iron ore to adjust the titanium content.

Pyrolusite or manganese dioxide may be employed if desired in connection with varying grades of iron ore to adjust the manganese content which occurs as an impurity in the ore.

The coating as above described is particularly suited for electrodes made from commercially pure ingot iron but we may apply it to any steel, iron, alloy or iron containing electrode, for example to a high manganese steel electrode, used to build up surfaces to withstand abrasion.

An electrode coating mixture made as described above includes among its advantages the facts that the materials are comparatively inexpensive; that the slag has the required melting point; that the slag, while protecting the deposited metal from oxidation, has no tendency to flow away from the deposited metal on to the unwelded portion of the work and become included in the weld; that the slag, having a different coefficient of expansion from the metal, is readily brushed from the deposited metal after cooling; also as explained that the composition serves to prevent inclusion of nitrogen and nitrides in the weld.

Having now described our invention, what we claim as new and desire to secure by Letters Patent is:—

1. A coating composition for electrodes containing the following substances in substantially the proportions specified, namely:—

| | Parts by weight. |
|---|---|
| China clay | 18–28 |
| Silicious fire-clay | 25–35 |
| Silica flour | 0–10 |
| Freshly burnt lime | 12–16 |
| Iron ore | 30–40 |
| Titaniferous ore | 10–0 |

2. A coating composition suitable for ferrous welding and like electrodes, which composition has a fusing point approximately equal to the fusing point of such an electrode and includes a silicious titanium-containing fireclay with an admixture of china clay, being also substantially free from carbonates and from carbon.

3. A coating composition suitable for ferrous welding and like electrodes, which composition has a fusing point approximately equal to the fusing point of such an electrode and includes a titanium compound in which the titanium content has been adjusted by the employment of a titaniferous body different from that carrying the main content of titanium, the composition being also substantially free from carbonates and from carbon.

4. A coating composition for electrodes including siliceous fireclay and titaniferous iron ore, being also substantially free from carbonates and from carbon.

5. Ferrous electrodes for welding and like purposes coated with a composition which has a fusing point approximately equal to that of the metal of the electrode and includes a titanium compound substantially free from carbonates and from carbon.

6. Ferrous electrodes for welding and like purposes coated with a composition which has a fusing point approximately equal to that of the metal of the electrode and includes a titanium compound substantially free from carbonates and from carbon applied to the metal in the nature of a paint and suitable for employment without subsequent fusion prior to use for welding.

7. Electrodes as claimed in claim 6 in which the coating includes siliceous titanium-containing fireclay.

8. Electrodes as claimed in claim 6 in which the coating includes siliceous fireclay with an admixture of china clay.

9. Electrodes as claimed in claim 6 in which the coating includes titaniferous iron ore.

In testimony whereof we have signed our names to this specification.

HENRY DAVID LLOYD.
CHARLES EDWARD HILL.